United States Patent
Pescaru et al.

(10) Patent No.: US 10,902,247 B1
(45) Date of Patent: Jan. 26, 2021

(54) QUANTIZED TRANSITION CHANGE DETECTION FOR ACTIVITY RECOGNITION

(71) Applicant: Everseen Limited, Blackpool (IE)

(72) Inventors: Dan Pescaru, Timisoara (RO); Cosmin Cernazanu-glavan, Timisoara Timis (RO); Vasile Gui, Timis (RO)

(73) Assignee: Everseen Limited, Blackpool (IE)

( * ) Notice: Subject to any disclaimer, the term of this patent is extended or adjusted under 35 U.S.C. 154(b) by 101 days.

(21) Appl. No.: 16/458,288

(22) Filed: Jul. 1, 2019

(51) Int. Cl.
  *G06K 9/00* (2006.01)
  *G06K 9/62* (2006.01)

(52) U.S. Cl.
  CPC ..... *G06K 9/00335* (2013.01); *G06K 9/00362* (2013.01); *G06K 9/00711* (2013.01); *G06K 9/6262* (2013.01); *G06K 9/6267* (2013.01)

(58) Field of Classification Search
  CPC . G06T 2207/10016; G06T 2207/10152; G06T 7/73; G06T 7/0012; G06T 2207/10072; G06T 2207/10132; G06T 2207/20081; G06T 2007/30232; G06T 7/246; G06T 7/251; G06T 7/277; G06T 7/70; G06T 2201/0065; G06T 2201/0202; G06T 19/006; G06T 1/0028; G06T 1/005; G06T 2201/0051; G06T 2201/0061; G06T 2207/20084; G06T 13/40; G06T 2207/10004; G06T 7/11; G06T 7/0002; G06T 7/62; G06T 7/43; G06T 7/174; G06T 7/75; G06T 9/002; G06T 7/20; G06T 7/215; G06T 7/344; G06T 7/55; G06T 7/60;

(Continued)

(56) References Cited

U.S. PATENT DOCUMENTS

2012/0320199 A1* 12/2012 Kundu ............... G06Q 20/202
  348/143
2013/0051662 A1* 2/2013 Shiozaki ............ G06K 9/00228
  382/159

(Continued)

OTHER PUBLICATIONS

Chan Wah Ng et al: "Real-Time Gesture Recognition System and Application", Image and Vision Computing, Elsevier, Guildford, GB, vol. 20, No. 13/14, Dec. 1, 2002 (Dec. 1, 2002), pp. 993-1007, XP001182462.

*Primary Examiner* — Nimesh Patel
(74) *Attorney, Agent, or Firm* — Young Basile Hanlon & MacFarlane, P.C.

(57) ABSTRACT

A system for recognizing human activity from a video stream includes a classifier for classifying an image frame of the video steam in one or more classes and generating a class probability vector for the image frame based on the classification. The system further includes a data filtering and binarization module for filtering and binarizing each probability value of the class probability vector based on a pre-defined probability threshold value. The system furthermore includes a compressed word composition module for determining one or more transitions of one or more classes in consecutive image frames of the video stream and generating a sequence of compressed words based on the determined one or more transitions. The system furthermore includes a sequence dependent classifier for extracting one or more user actions by analyzing the sequence of compressed words to and recognizing human activity therefrom.

19 Claims, 3 Drawing Sheets

(58) Field of Classification Search
CPC .......... G06T 2207/10024; G06T 7/194; G06T 2207/20072; G06T 2207/30196; G06T 7/77; G06T 2207/30164; G06T 2207/30201; G06T 2207/30204; G06T 7/0004; G06T 7/269; G06T 7/136; G06T 7/593; G06F 16/313; G06F 16/345; G06F 16/94; G06F 3/0425; G06F 12/0207; G06F 12/04; G06F 12/0607; G06F 13/28; G06F 16/3334; G06F 16/3344; G06F 9/4494; G06F 15/7867; G06F 3/0304; G06F 8/24; G06F 9/454; G06F 9/465; G06F 16/90335; G06F 16/904; G06F 2111/10; G06F 40/232; G06F 40/253; G06F 40/35; G06F 21/552; G06F 21/554; G06F 2221/07; G06F 3/016; G06F 3/0346; G06F 3/017; G06F 3/014; G06F 1/163; G06F 21/32; G06F 17/18; G06F 11/3438; G06F 16/55; G06F 3/0482; G06F 3/04842; G06F 9/542; G06K 9/741; G06K 9/00335; G06K 9/46; G06K 9/6212; G06K 2009/6213; G06K 2209/05; G06K 9/00208; G06K 9/00778; G06K 9/6211; G06K 9/623; G06K 9/6254; G06K 9/6814; G06K 19/06037; G06K 19/06065; G06K 19/0614; G06K 2019/0629; G06K 9/4628; G06K 9/00771; G06K 2009/00738; G06K 9/00671; G06K 9/6256; G06K 9/6265; G06K 2209/01; G06K 2209/17; G06K 9/00201; G06K 9/00221; G06K 9/00268; G06K 9/00348; G06K 9/00355; G06K 9/00624; G06K 9/3233; G06K 9/325; G06K 9/6293; G06K 9/00362; G06K 9/4604; G06K 9/6202; G06K 9/00832; G06K 9/4642; G06K 9/6267; G06K 2009/0059; G06K 9/4671; G06K 9/6215; G06K 9/00369; G06K 9/00711; G06K 9/00765; G06K 9/6218; G06K 9/00375; G06Q 30/06; G06Q 40/04; G06Q 40/12; G06Q 50/188; G06Q 10/087; G06Q 20/04; G06Q 20/10; G06Q 20/102; G06Q 30/04; G06Q 30/0609; G06Q 30/0633; G06Q 30/08; G06Q 40/02; G06Q 50/18; G06Q 50/184; G06Q 20/208; G06Q 10/10; G06Q 20/3224; G06Q 30/02; G06Q 30/0217; G06Q 20/12; G06Q 20/327; G06Q 10/06311; G06Q 10/06316; G06Q 10/0875; G06Q 20/065; G06Q 20/0655; G06Q 20/203; G06Q 30/0643; G06N 3/049; G06N 3/0635; G06N 3/0675; G06N 20/00; G06N 5/04; G06N 5/02; G06N 7/005; G06N 3/0454; G06N 3/08; G06N 3/0472; G06N 3/0481; G06N 5/048; G06N 3/004; G06N 3/0427; G06N 3/086; G06N 5/022; G06N 5/025; G08B 13/19604; G08B 13/19608; G08B 13/19613; G08B 13/19652; G08B 13/1968; G07G 1/0072; G07G 1/0036

See application file for complete search history.

(56) References Cited

U.S. PATENT DOCUMENTS

| | | | |
|---|---|---|---|
| 2014/0294360 A1 | 10/2014 | Raptis et al. | |
| 2015/0294192 A1* | 10/2015 | Lan ................ | G06K 9/627 |
| | | | 382/159 |
| 2015/0379497 A1* | 12/2015 | Florez ............ | G06Q 20/208 |
| | | | 705/17 |
| 2018/0096567 A1* | 4/2018 | Farrow ........... | G06Q 20/4016 |
| 2020/0258067 A1* | 8/2020 | O'Herlihy ...... | G07G 3/00 |
| 2020/0302029 A1* | 9/2020 | Holm ............. | G06K 9/6253 |

* cited by examiner

QUANTIZED TRANSITION CHANGE DETECTION FOR ACTIVITY RECOGNITION

TECHNICAL FIELD

The present disclosure relates generally to artificial intelligence, and more specifically, to human activity recognition from a video stream and symbolic processing.

BACKGROUND

With advancement in technology, recognition of human physical activities is gaining tremendous importance. The recognition of human physical activities contributes towards various applications such as surveillance of a retail store check-out process involving a self-check out (SCO) system. Such a system allows buyers to complete a process of purchasing by themselves. Another example of application of recognition of human physical activities is providing assistance in video surveillance by detecting unfair activities done by shop lifters such as theft and thereby alerting a personnel employed in the shop to prevent the theft. Moreover, recognition of human physical activities is employed in intelligent driver assisting systems, assisted living systems for humans in need, video games, physiotherapy, and so forth. Furthermore, recognition of human physical activities is actively used in the field of sports, military, medical, robotics and so forth.

Human physical activities represent the building blocks of most process modelling. However, as human behaviour is unpredictable, the recognition of such human physical activities in a diverse environment is a difficult task. The human physical activity is typically decomposable into a set of basic actions involving various human body parts, such as hands, feet, face, and so forth. Moreover, the set of basic actions associated with the human physical activity are spanned over a plurality of time intervals. Recognition tasks of such activities face the problem of summarizing the overall sequence of actions over a variable time interval.

The conventional human physical activity recognition techniques are inefficient in recognizing the human physical activities, due to a different body structure, a different body shape, a different skin colour and so forth of each human body. Also, the time frame for a human activity pose important variation in time depending on the subject, and maybe other environment conditions. Moreover, not all the basic body parts movements are related with the purpose of the considered activity. Therefore, the activity recognition process face two major problems related with actions time variation and physical trajectory variation of human body parts involved in the activity.

Therefore, in light of the foregoing discussion, there exists a need to overcome the aforementioned drawbacks associated with the recognition of human physical activities, and provide a system and method that aims to reduce the influence of time variation and the variety of body parts movements in activity recognition using a recurrent neural network.

SUMMARY

The present disclosure seeks to provide a system for recognizing human activity from a video stream and a method thereof.

According to an aspect of the present disclosure, there is provided a system for recognizing human activity from a video stream captured by an imaging device. The system includes a memory to store one or more instructions, and a processor communicatively coupled to the memory. The system includes a classifier communicatively coupled to the imaging device, and configured to classify an image frame of the video steam in one or more classes of a set of pre-defined classes, wherein the image frame is classified based on user action in a region of interest of the image frame, and generate a class probability vector for the image frame based on the classification, wherein the class probability vector includes a set of probabilities of classification of the image frame in each pre-defined class. The system further includes a data filtering and binarization module configured to filter and binarize each probability value of the class probability vector based on a pre-defined probability threshold value. The system further includes a compressed word composition module configured to determine one or more transitions of one or more classes in one or more consecutive image frames of the video stream, based on corresponding binarized probability vectors, and generate a sequence of compressed words based on the determined one or more transitions in the one or more consecutive image frames. The system further includes a sequence dependent classifier configured to extract one or more user actions by analyzing the sequence of compressed words, and recognize human activity therefrom.

According to another aspect of the present disclosure, there is provided a method for recognizing human activity from a video stream. The method includes classifying by a classifier, an image frame of the video steam in one or more classes of a set of pre-defined classes, wherein the image frame is classified based on user action in a region of interest of the image frame. The method further includes generating a class probability vector for the image frame based on the classification, wherein the class probability vector includes a set of probabilities of classification of the image frame in each pre-defined class. The method furthermore includes binarizing each probability value of the class probability vector based on a pre-defined probability threshold value. The method furthermore includes determining one or more transitions of one or more classes in one or more consecutive image frames of the video stream, based on corresponding binarized probability vectors. The method furthermore includes generating a sequence of compressed words based on the determined one or more transitions in the one or more consecutive image frames. The method furthermore includes extracting one or more user actions by analyzing the sequence of compressed words to, and recognize human activity therefrom.

According to yet another aspect of the present disclosure, there is provided a computer programmable product for recognizing human activity from a video stream, the computer programmable product comprising a set of instructions. The set of instructions when executed by a processor causes the processor to classify an image frame of the video steam in one or more classes of a set of pre-defined classes, wherein the image frame is classified based on user action in a region of interest of the image frame, generate a class probability vector for the image frame based on the classification, wherein the class probability vector includes a set of probabilities of classification of the image frame in each pre-defined class, binarize each probability value of the class probability vector based on a pre-defined probability threshold value, determine one or more transitions of one or more classes in one or more consecutive image frames of the video stream, based on corresponding binarized probability vectors, generate a sequence of compressed words based on the determined one or more transitions in the one or more consecutive image frames, and extract one or more user actions by analyzing the sequence of compressed words to extract one or more user actions, and recognize human activity therefrom.

The present disclosure seeks to provide a system for recognizing human activity from a video stream. Such a system enables efficient and reliable recognition of human activities from the video stream.

It will be appreciated that features of the present disclosure are susceptible to being combined in various combinations without departing from the scope of the present disclosure as defined by the appended claims.

DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
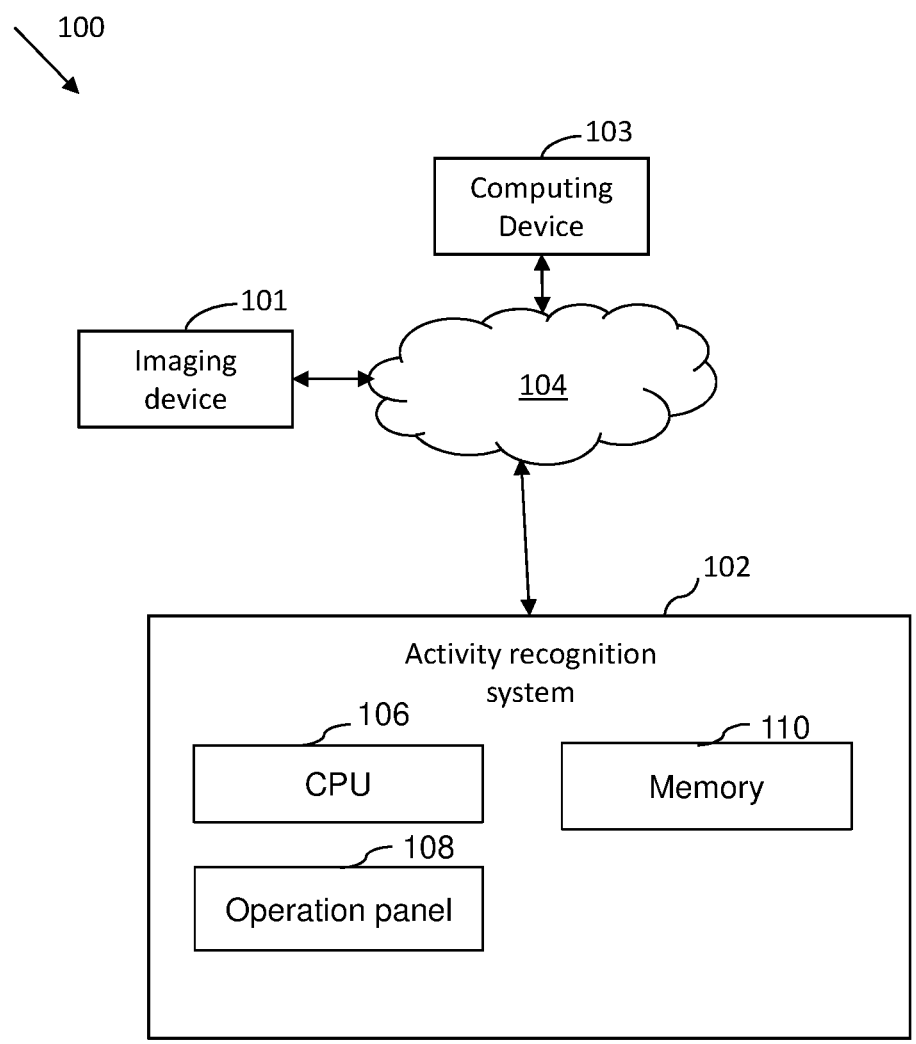
FIG. 1 illustrates an environment, wherein various embodiments of the present disclosure can be practiced.

FIG. 1 illustrates an environment 100, wherein various embodiments of the present disclosure can be practiced. The environment 100 includes an imaging device 101, an activity recognition system 102, and a computing device 103, communicatively coupled to each other through a communication network 104. The communication network 104 may be any suitable wired network, wireless network, a combination of these or any other conventional network, without limiting the scope of the present disclosure. Few examples may include a Local Area Network (LAN), wireless LAN connection, an Internet connection, a point-to-point connection, or other network connection and combinations thereof.

The imaging device 101 is configured to capture a video stream. In an embodiment of the present disclosure, the imaging device 101 is configured to capture one or videos of a retail check out process including a Self-check out system (SCO). Optionally, the imaging device 101 includes, but not limited to, an Internet protocol (IP) camera, a Pan-Tilt-Zoom (PTZ) camera, a thermal image camera or an Infrared camera.

The activity recognition system 102 is configured to recognize human actions and human activities in the video stream captured by the imaging device 101.

The activity recognition system 102 includes a central processing unit (CPU) 106, an operation panel 108, and a memory 110. The CPU 106 is a processor, computer, microcontroller, or other circuitry that controls the operations of various components such as the operation panel 108, and the memory 110. The CPU 106 may execute software, firmware, and/or other instructions, for example, that are stored on a volatile or non-volatile memory, such as the memory 110, or otherwise provided to the CPU 106. The CPU 106 may be connected to the operation panel 108, and the memory 110, through wired or wireless connections, such as one or more system buses, cables, or other interfaces. In an embodiment of the present disclosure, the CPU 106 may include a custom Graphic processing unit (GPU) server software to provide realtime object detection and prediction, for all cameras on a local network.

The operation panel 108 may be a user interface for the image forming apparatus 100 and may take the form of a physical keypad or touchscreen. The operation panel 108 may receive inputs from one or more users relating to selected functions, preferences, and/or authentication, and may provide and/or receive inputs visually and/or audibly.

The memory 110, in addition to storing instructions and/or data for use by the CPU 106 in managing operation of the image forming apparatus 100, may also include user information associated with one or more users of the image forming apparatus 100. For example, the user information may include authentication information (e.g. username/password pairs), user preferences, and other user-specific information. The CPU 106 may access this data to assist in providing control functions (e.g. transmitting and/or receiving one or more control signals) related to operation of the operation panel 108, and the memory 110.

The imaging device 101 and the activity recognition system 102 may be controlled/operated by the computing device 103. Examples of the computing device 103 include a smartphone, a personal computer, a laptop, and the like. The computing device 103 enables the user/operator to view and save the videos captured by the imaging device 101, and access the videos/images processed by the activity recognition system 102. The computing device 103 may execute a mobile application of the activity recognition system 102 so as to enable a user to access and process the video stream captured by the imaging device 101.

In an embodiment, the camera 101, the activity recognition system 102, and the computing device 103 may be integrated in a single device, where the single device is a portable smartphone having a built-in camera and a display.

Figure 2:
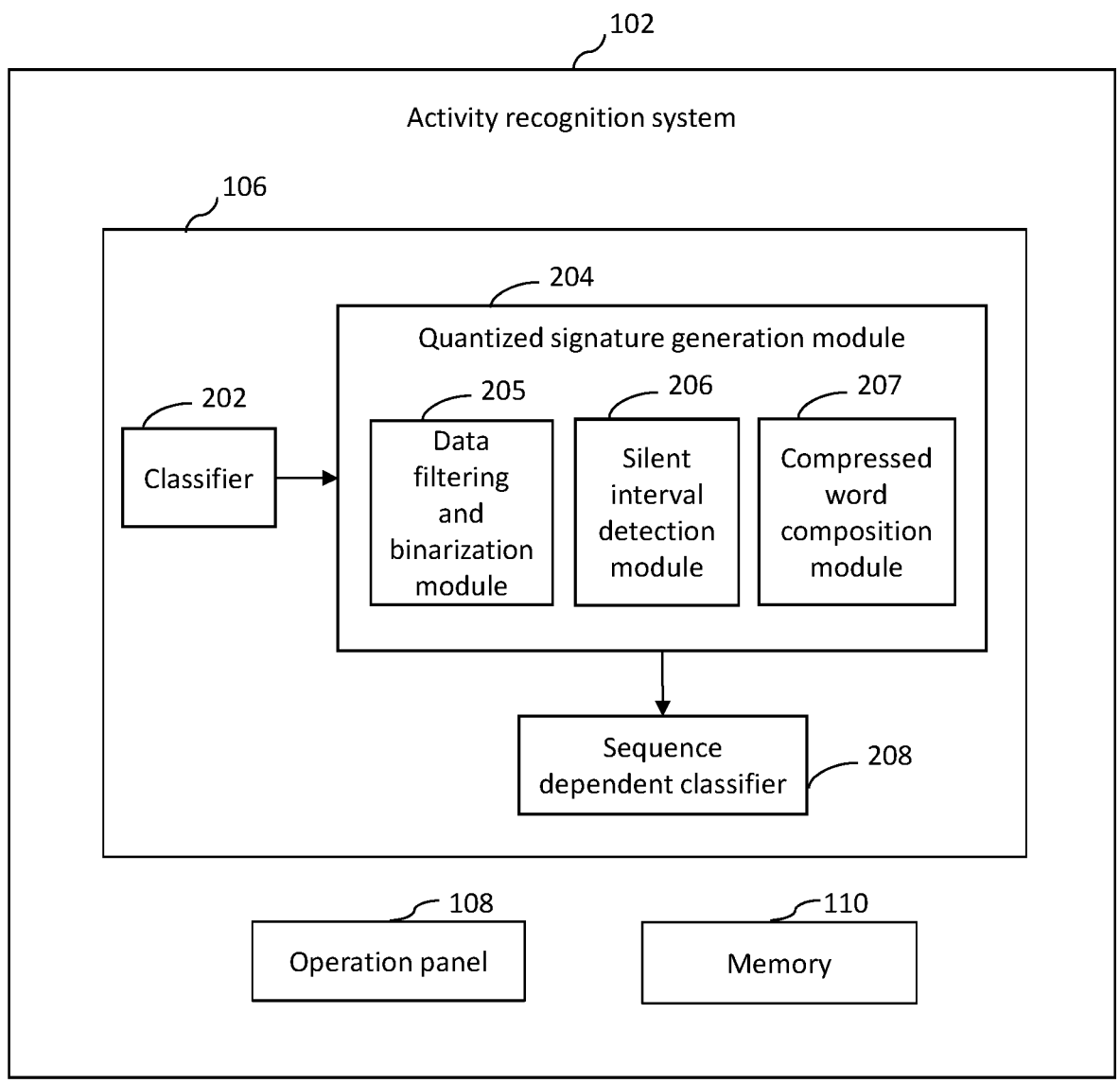
FIG. 2 illustrates the activity recognition system for recognizing one or more human actions and activity in the video stream captured by the imaging device of FIG. 1, in accordance with an embodiment of the present disclosure.

FIG. 2 illustrates the activity recognition system 102 for recognizing one or more human actions and activity in the video stream captured by the imaging device 101, in accordance with an embodiment of the present disclosure.

The activity recognition system 102 includes the CPU 106 that includes a classifier 202 that is operable to analyze each frame of the video stream to determine at least one action region of interest, wherein the at least one region of interest comprise at least one object. The action region of interest refers to a rectangular area in each frame of the video stream, where in the at least one object is seen and one or more actions take place. In an example, the at least one object may be a person, objects such as clothing items, groceries, wallet and so forth, and one or more actions may include a person taking out wallet from its pocket, the person walking in a queue, the person swiping a credit card, and the like. Each action can be used as a building block for process model extraction, wherein a process can be expressed as a chain of actions.

In an embodiment of the present disclosure, the classifier 202 may be an algorithm-based classifier such as a convolutional neural network (CNN) trained to classify an image frame of the video of the SCO scan area (scanning action region of interest) in classes such as hand, object in hand, object, body part, empty scanner. The criteria for classification of an image frame in each class has been mentioned below:

Hand—The image frame shows human hand(s).
Object in hand—The image frame shows an object in a hand of the user.
Object—The image frame shows only object
Body part—The image frame shows a human body part
Empty scanner—The image frame shows only the empty scanner The CNN as referred herein is defined as trained deep artificial neural networks that is used primarily to classify the at least one object in the at least one region of interest. Notably, they are algorithms that can identify faces, individuals, street signs, and the like. The term "neural network" as used herein can include a highly interconnected network of processing elements, each optionally associated with a local memory. In an example, the neural network may be a Kohonen map, a multi-layer perceptron, and so forth. Furthermore, the processing elements of the neural networks can be "artificial neural units", "artificial neurons," "neural units," "neurons," "nodes," and the like. Moreover, the neuron can receive data from an input or one or more other neurons, process the data, and send processed data to an output or yet one or more other neurons. The neural network or one or more neurons thereof can be generated in either hardware, software, or a combination of hardware and software, and the neural network can be subsequently trained. It will be appreciated that the convolutional neural network (CNN) consists of an input layer, a plurality of hidden layers and an output layer. Moreover, the plurality of hidden layers of the convolutional neural network typically consist of convolutional layers, pooling layers, fully connected layers and normalization layers. Optionally, a Visual Geometry Group 19 (VGG 19) model is used as a convolutional neural network architecture. The VGG 19 model is configured to classify the at least one object in the frame of the video stream into classes. It will be appreciated that hidden layers comprise a plurality of sets of convolution layers.

In operation, the classifier 202 receives and classifies an image frame of the video stream of the SCO scan area (scanning action region of interest) in classes such as hand, object in hand, object, body part, empty scanner based on content of the image frame. In an embodiment of the present disclosure, the classifier 202 analyses each image frame statically and for each image frame, outputs a class probability vector $P_v$ having one component for each considered class, such that, $P_v = \{P_{Hand}, P_{HandObject}, P_{Object}, P_{BodyPart}, P_{EmptyScanner}\}$ Where $P_{Hand}$=Probability of the image frame to be classified in class 'hand'
$P_{HandObject}$=Probability of the image frame to be classified in class 'object in hand'
$P_{Object}$=Probability of the image frame to be classified in class 'object'
$P_{BodyPart}$=Probability of the image frame to be classified in class 'body part"
$P_{EmptyScanner}$=Probability of the image frame to be classified in class 'empty scanner"

In an example, the classifier 202 generates six probability vectors $P_{v1}$ till $P_{v6}$ for six consecutive image frames in five classes, in a format given below.

$P_{v1}=\{0.0,0.0,0.0,0.0,1.0\}$ $P_{v2}=\{0.0,0.0,0.28,0.0,0.72\}$ $P_{v3}=\{0.0,0.0,0.26,0.0,0.74\}$ $P_{v4}=\{0.0,0.0,0.19,0.0,0.81\}$ $P_{v5}=\{0.0,0.0,0.29,0.0,0.71\}$ $P_{v6}=\{0.0,0.45,0.14,0.0,0.41\}$

The CPU 106 further includes a quantized signature generation module 204 for generating a quantized signature for each scan action determined by the classifier 202. A scan action is a user action performed for scanning an item in a scanning zone of a self-check out (SCO) terminal.

The quantized signature generation module 204 includes a data filtering and binarization module 205, a silent interval detection module 206, and a compressed word composition module 207.

The data filtering and binarization module 205 is configured to apply a filter on the class probability vectors generated by the classifier 202 to minimize errors by the classifier 202. A classifier error appears if the classifier 202 classifies a continuous movement on the scanner using a single class for the entire sequence except one isolated frame. In such case, the isolated frame may be wrongly classified.

Below is an example output of probability vectors from the classifier 202 for six consecutive image frames of the video stream, wherein the six consecutive image frames cover a continuous movement over the scanner. For an image frame in, each probability vector Pvn includes probabilities of classification of the image frame in each of the five classes "hand", "object in hand", "object", "body part", and "empty scanner".

$P_{v1}=\{0.0,0.0,0.28,0.0,0.72\}$ $P_{v2}=\{0.0,0.0,0.28,0.0,0.72\}$ $P_{v3}=\{0.0,0.0,0.01,0.27,0.72\}$ $P_{v4}=\{0.0,0.0,0.28,0.0,0.72\}$ $P_{v5}=\{0.0,0.0,0.28,0.0,0.72\}$ $P_{v6}=\{0.0,0.0,0.28,0.0,0.72\}$

It can be clearly seen that the probability vector $P_{v3}$ of the third image frame of the video sequence is different, which means that there is an error in the classification of the third image frame by the classifier 202. The data filtering and binarization module 205 rectifies the error in the classification of the third image frame based on the information that the six frames cover substantially similar information. In an embodiment of the present disclosure, the data filtering and binarization module 205 rectifies the error by removing the erroneous frame.

The data filtering and binarization module 205 is then configured to binarize the filtered values of probability vectors using a heuristic threshold value, such that each component of a probability vector is assigned a value "1" if it is equal to or greater than the heuristic threshold value, else "0".

In an example, when heuristic threshold value is 0.2, exemplary filtered probability vectors $P_{vf}$ for five consecutive image frames may be represented as below:

$$P_{vf1}=\{0.0,0.0,0,1.0\}$$

$$P_{vf2}=\{0.0,0.0,0,0.28,0.0,0.72\}$$

$$P_{vf3}=\{0.0,0.0,0,0.26,0.0,0.74\}$$

$$P_{vf4}=\{0.0,0.0,0,0.39,0.0,0.71\}$$

$$P_{vf5}=\{0.0,0.45,0.14,0.0,0.41\}$$

and corresponding binarized probability vectors Pvb may be represented as below:

$$P_{vb1}=\{0\ 0\ 0\ 0\ 1\}$$

$$P_{vb2}=\{0\ 0\ 1\ 0\ 1\}$$

$$P_{vb3}=\{0\ 0\ 1\ 0\ 1\}$$

$$P_{vb4}=\{0\ 0\ 1\ 0\ 1\}$$

$$P_{vb5}=\{0\ 1\ 0\ 0\ 1\}$$

Each binarized probability vector Pvb is thus a binarized string of a series of binary numbers, that can be used to determine transitions of classes in consecutive frames. For example, in the first image frame, the binary value corresponding to class 'object' is '0', and in the second image frame, the binary value corresponding to class 'object' is '1', which means that there is clearly a transition of class from the first to second image frame. Similarly, in the fourth image frame, the binary value corresponding to class 'object in hand' is '0', and the binary value corresponding to class 'object' is '1'. In the fifth frame, the binary value for 'object in hand' changes to '1', and the binary value for 'object' changes to '0'. This clearly indicates that the user has kept the object in their hand during transition from fourth to fifth frame. Thus, the binarized/quantized probability vectors provide information about transition of classes in consecutive image frames.

The silent interval detection module 206 is configured to detect one or more silent intervals in the video stream. In an embodiment of the present disclosure, during silent interval, no activity is detected in the scanning zone for a threshold time duration. In an example, the threshold time duration may be set as '0.5 s', and a time interval of more than 0.5 s is marked as 'silent interval' when the binary value of class "empty scanner" of corresponding image frames remains '1' during the entire time interval.

The compressed word composition module 207 is configured to generate a sequence of compressed words based on the binarized strings generated by the data filtering and binarization module 205. The compressed words are generated based on the transition of classes from '1' to '0' and '0' to '1' in consecutive image frames.

In an embodiment of the present disclosure, each word is composed from letters of an alphabet containing 2*N letters correlated with the process actions semantics, where N represents the number of classes. In an example, if the number of classes is 5, then each word is composed from total 10 letters. For each class a "0→1" transition generates a specific "beginning" letter (e.g. 'O' for the class Object), while a "1→0" transition generates an "ending" letter (e.g. 'o' for the class Object).

Thus, the alphabet for five classes: 'hand', 'object in hand', 'object', 'body part', and 'empty scanner', contains the following letters:
classHand up:H down:h
classHandObject up:Q down:q
classObject up:O down:o
classBodyPart up: B down: b
classEmptyScanner up: E down: e In an embodiment of the present disclosure, two adjacent words are separated by at least one frame classified as "empty scanner". This could represent or not a silent interval depending on the length of consecutive '1' 'empty scanner' values.

An example of quantized output generated by the compressed word composition module 207 is represented below:
Silence
OoE
Silence
OQoOqBobE
Silence The sequence dependent classifier 208 is configured to receive the quantized output from the compressed word composition module 207, and extract one or more scan actions from the continuous sequence of transitions represented as alphabet letters. The sequence dependent classifier 208 includes a machine learning based engine, as used herein relates to an engine that is capable of studying of algorithms and statistical models and use them to effectively perform a specific task without using explicit instructions, relying on patterns and inference. Examples of the sequence dependent classifier 208 include a recurrent neural network (RNN), a K nearest neighbor algorithm (KNN), and a support vector machine (SVM) algorithm, and so forth.

The sequence dependent classifier 208 analyzes the sequence of compressed words to recognize the human activity from the video stream. The sequence of compressed words is analyzed in order to determine various transitions of the classes in the region of interest. Such determination of the transitions of the classes leads to the recognition of the human activity from the video stream. The sequence dependent classifier 208 recognize transitions of the binarized input signal which suggest basic actions.

Thus, the quantized signature generation module 204 provides a quantization process for input signals coming from the classifier 202 observing a region of interest where an activity take place. The method for transitions quantization aims to reduce the influence of time variation and the variety of body parts movements in activity recognition using the sequence dependent classifier 208.

Figure 3:
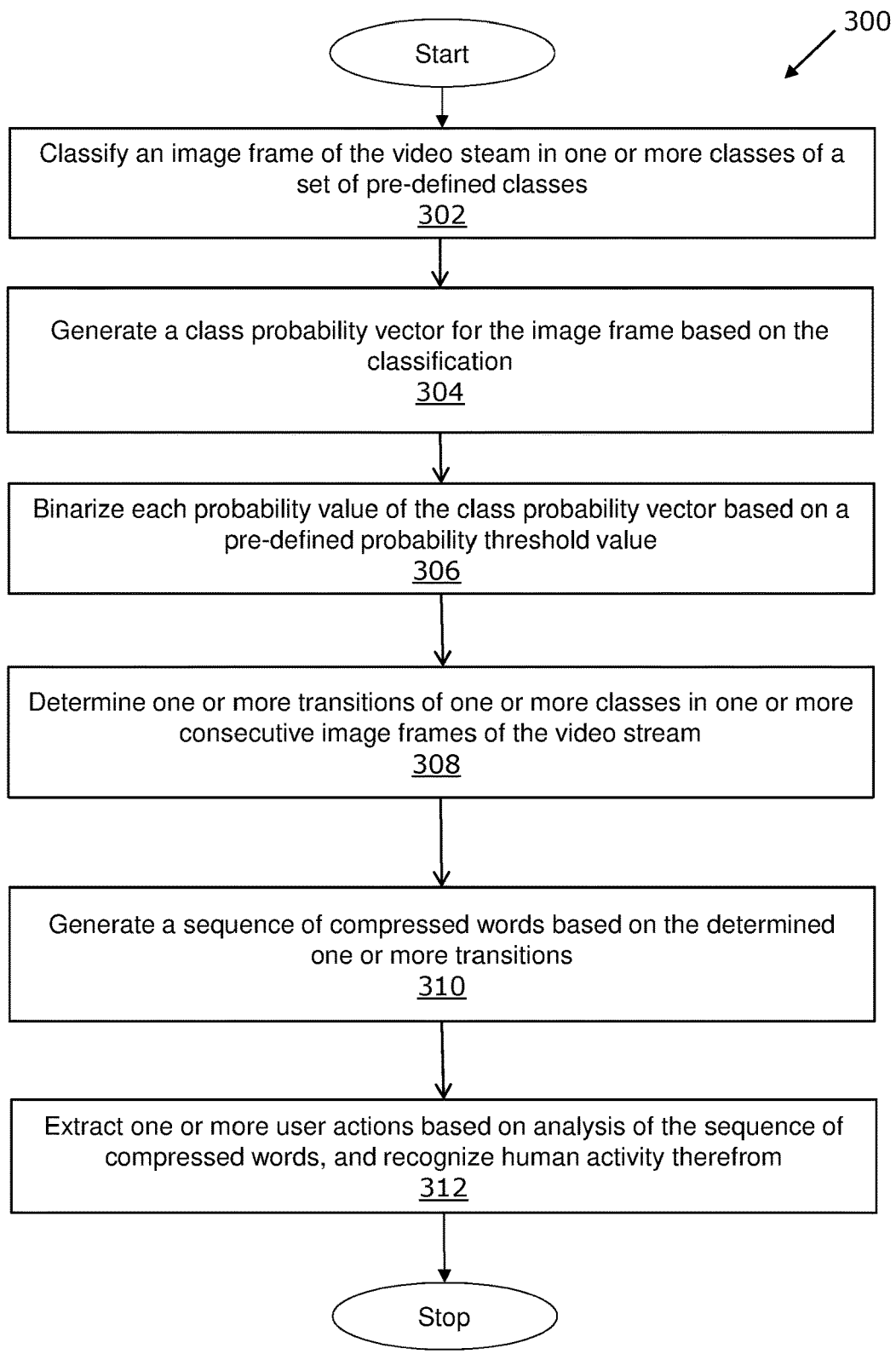
FIG. 3 is a flowchart illustrating a method for recognizing human activity from a video stream, in accordance with an embodiment of the present disclosure.

FIG. 3 is a flowchart illustrating a method 300 for recognizing human activity from a video stream, in accordance with an embodiment of the present disclosure. Some steps may be discussed with respect to the system as shown in FIG. 2.

At step 302, an image frame of the video steam in one or more classes of a set of pre-defined classes is classified by a classifier, wherein the image frame is classified based on user action in a region of interest of the image frame. In an embodiment of the present disclosure, the classifier is a convolutional neural network. In another embodiment of the present disclosure, the set of predefined classes for a Self-check out (SCO) scanning zone, include classes such as hand, object in hand, object, body part, and empty scanner.

At step 304, a class probability vector is generated for the image frame based on the classification, wherein the class probability vector includes a set of probabilities of classification of the image frame in each pre-defined class. In an example, a class probability vector $P_v$ is represented by:

$$P_v = \{P_{Hand}, P_{HandObject}, P_{Object}, P_{BodyPart}, P_{EmptyScanner}\}$$

Where $P_{Hand}$=Probability of the image frame to be classified in class 'hand'
$P_{HandObject}$=Probability of the image frame to be classified in class 'object in hand'
$P_{Object}$=Probability of the image frame to be classified in class 'object'
$P_{BodyPart}$=Probability of the image frame to be classified in class 'body part"
$P_{EmptyScanner}$=Probability of the image frame to be classified in class 'empty scanner"

At step 306, each probability value of the class probability vector is binarized based on a pre-defined probability threshold value. In an example, each component of a probability vector is assigned a value "1" if it is equal to or greater than the heuristic threshold value, else "0".

At step 308, one or more transitions of one or more classes are determined in one or more consecutive image frames of the video stream, based on corresponding binarized probability vectors. For example, if in the first image frame, the binary value corresponding to class 'object' is '0', and in the second image frame, the binary value corresponding to class 'object' is '1', which means that there is clearly a transition of class from the first to second image frame.

At step 310, a sequence of compressed words is generated based on the determined one or more transitions in the one or more consecutive image frames. The compressed words are generated based on the transition of classes from '1' to '0' and '0' to '1' in consecutive image frames. In an embodiment of the present disclosure, a compressed word is formed from letters of an alphabet containing number of letters equivalent to twice the number of pre-defined classes. Further, each of the compressed word of the sequence of compressed words comprise at least one frame of non-activity therebetween. In an example, if the number of classes is 5, then each word is composed from total 10 letters. For each class a "0→1" transition generates a specific "beginning" letter (e.g. 'O' for the class Object), while a "1→0" transition generates an "ending" letter (e.g. 'o' for the class Object).

At step 312, one or more user actions are extracted based on analysis of the sequence of compressed words by a sequence dependent classifier. The one or more user actions may be used to recognize human activity in the SCO scan area (scanning action region of interest), and transmits the recognition results to a user computing device. In some embodiments, the user computing device may be configured to store or display the recognition results. In an embodiment of the present disclosure, the sequence dependent classifier is a recurrent neural network.

The present disclosure also relates to software products recorded on machine-readable non-transient data storage media, wherein the software products are executable upon computing hardware to implement methods of recognizing human activity from a video stream.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

The invention claimed is:

1. A system for recognizing human activity from a video stream captured by an imaging device, the system comprising:
   a memory to store one or more instructions; and
   a processor communicatively coupled to the memory to execute the one or more instructions, wherein the processor comprises:
   a classifier communicatively coupled to the imaging device, and configured to:
      classify an image frame of the video steam in one or more classes of a set of pre-defined classes, wherein the image frame is classified based on user action in a region of interest of the image frame; and
      generate a class probability vector for the image frame based on the classification, wherein the class probability vector includes a set of probabilities of classification of the image frame in each pre-defined class;
   a data filtering and binarization module configured to filter and binarize each probability value of the class probability vector based on a pre-defined probability threshold value;
   a compressed word composition module configured to:
      determine one or more transitions of one or more classes in one or more consecutive image frames of the video stream, based on corresponding binarized probability vectors; and
      generate a sequence of compressed words based on the determined one or more transitions in the one or more consecutive image frames; and
   a sequence dependent classifier configured to extract one or more user actions by analyzing the sequence of compressed words to, and recognize human activity therefrom.

2. The system as claimed in claim 1, wherein the classifier is a convolutional neural network.

3. The system as claimed in claim 1, wherein the set of predefined classes for a Self-check out (SCO) scanning zone, include classes such as hand, object in hand, object, body part, and empty scanner.

4. The system as claimed in claim 1, wherein the data filtering and binarization module is further operable to eliminate classifier errors in the class probability vectors of one or more consecutive image frames.

5. The system as claimed in claim 1, wherein the processor further comprises a silent interval detection module, wherein the silent interval detection module is configured to detect one or more silent intervals in the video stream based on no activity detection in the region of interest for a predefined threshold duration.

6. The system as claimed in claim 1, wherein a compressed word is formed from letters of an alphabet containing number of letters equivalent to twice the number of pre-defined classes.

7. The system as claimed in claim 1, wherein each of the compressed word of the sequence of compressed words comprise at least one frame of non-activity therebetween.

8. The system as claimed in claim 1, wherein the sequence dependent classifier is a recurrent neural network.

9. A method for recognizing human activity from a video stream, the method comprising
classifying by a classifier, an image frame of the video steam in one or more classes of a set of pre-defined classes, wherein the image frame is classified based on user action in a region of interest of the image frame;
generating a class probability vector for the image frame based on the classification, wherein the class probability vector includes a set of probabilities of classification of the image frame in each pre-defined class;
binarizing each probability value of the class probability vector based on a pre-defined probability threshold value;
determining one or more transitions of one or more classes in one or more consecutive image frames of the video stream, based on corresponding binarized probability vectors;
generating a sequence of compressed words based on the determined one or more transitions in the one or more consecutive image frames; and
extracting one or more user actions by analyzing the sequence of compressed words by a sequence dependent classifier and recognizing human activity therefrom.

10. The method as claimed in claim 9, wherein the classifier is a convolutional neural network.

11. The method as claimed in claim 9, wherein the set of predefined classes for a Self-check out (SCO) scanning zone, include classes such as hand, object in hand, object, body part, and empty scanner.

12. The method as claimed in claim 9 further comprising eliminating classifier errors in the class probability vectors of one or more consecutive image frames.

13. The method as claimed in claim 9, further comprising detecting one or more silent intervals in the video stream based on no activity detection in the region of interest for a predefined threshold duration.

14. The method as claimed in claim 9, wherein a compressed word is formed from letters of an alphabet containing number of letters equivalent to twice the number of pre-defined classes.

15. The method as claimed in claim 9, wherein each of the compressed word of the sequence of compressed words comprise at least one frame of non-activity therebetween.

16. The method as claimed in claim 9, wherein the sequence dependent classifier is a recurrent neural network.

17. A computer programmable product for recognizing human activity from a video stream, the computer programmable product comprising a set of instructions, the set of instructions when executed by a processor causes the processor to:
classify an image frame of the video steam in one or more classes of a set of pre-defined classes, wherein the image frame is classified based on user action in a region of interest of the image frame;
generate a class probability vector for the image frame based on the classification, wherein the class probability vector includes a set of probabilities of classification of the image frame in each pre-defined class;
binarize each probability value of the class probability vector based on a pre-defined probability threshold value;
determine one or more transitions of one or more classes in one or more consecutive image frames of the video stream, based on corresponding binarized probability vectors;
generate a sequence of compressed words based on the determined one or more transitions in the one or more consecutive image frames; and
extract one or more user actions by analyzing the sequence of compressed words to, and recognizing human activity therefrom.

18. The computer programmable product as claimed in claim 17, wherein a compressed word is formed from letters of an alphabet containing number of letters equivalent to twice the number of pre-defined classes.

19. The computer programmable product as claimed in claim 17, wherein each of the compressed word of the sequence of compressed words comprise at least one frame of non-activity therebetween.

* * * * *